– 1 –

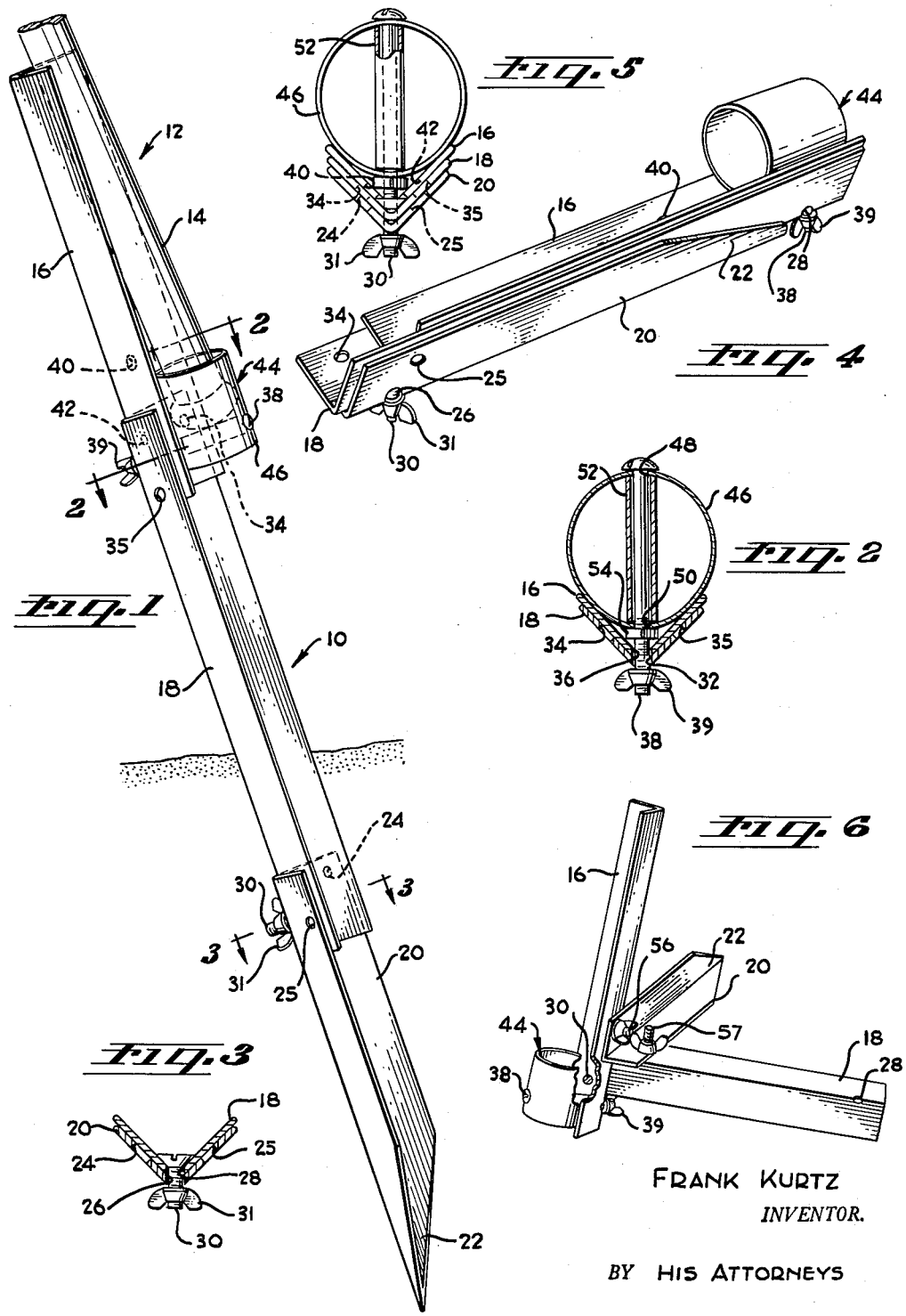

2,999,660
UNIVERSAL FISHING SPIKE
Frank Kurtz, 926 S. Curson Ave., Los Angeles 36, Calif.
Filed Mar. 27, 1959, Ser. No. 802,513
8 Claims. (Cl. 248—48)

The present invention relates generally to the fishing equipment art and more particularly to a universal fishing spike which can be used for supporting a fishing rod in sand, amongst rocks, or on a hard flat surface.

Briefly, the device comprises three elongated body members of approximately the same length, one of which contains a socket for receiving the handle of a fishing rod. The body members are shaped in such a manner and include attachment means whereby they can be assembled in end-to-end relationship to provide a long support for insertion in sand, or they can be assembled in the form of a tripod for use on hard flat surfaces, or they can be nested together, one on top of the other, during storage or while being carried. The device in collapsed position takes up very little space, which is an advantage not only in a fisherman's kit but in stores selling the equipment.

As is well known in the art, there are numerous types of fishing or sand spikes for supporting fishing rods in various situations. However, most of these are quite cumbersome and not adapted to use under varying situations encountered in fishing.

It is an object of the present invention, therefore, to provide a novel fishing spike which has a universal application in that it can be used in sand or loose soil, amongst rocks, or on a hard flat surface. More particularly, it is an object to provide such a device which can be easily and quickly changed from one assembled position to another so that a fisherman has only to carry one fishing spike regardless of whether he intends to fish from a sandy beach, a rocky shore, or from a hard flat surface.

Another object is to provide a universal fishing spike which can be easily disassembled and reduced to a compact package so that it can be carried in a tackle box.

Still another object is to provide a novel universal fishing spike which is rugged in construction, yet simple in design, and which is relatively inexpensive to manufacture.

Further objects and advantages of the present invention will be apparent from the following detailed description, reference being had to the accompanying drawing wherein a preferred embodiment of the present invention is shown.

In the drawing:

FIG. 1 is a perspective view of a universal fishing spike constructed in accordance with the teachings of the present invention, shown assembled for use in sand or amongst rocks;

FIG. 2 is an enlarged horizontal sectional view taken on the line 2—2 in FIG. 1;

FIG. 3 is an enlarged horizontal sectional view taken on the line 3—3 in FIG. 1;

FIG. 4 is a perspective view of the device shown in the nested or carrying position;

FIG. 5 is an enlarged end view taken from the left-hand end of FIG. 4; and

FIG. 6 is a perspective view of the device shown assembled in the tripod position for use on a hard flat surface.

Referring to the drawing more particularly by reference numerals, 10 indicates generally a universal fishing spike embodying the teachings of the present invention, for use with a fishing rod 12 which includes a handle portion 14.

As shown in FIG. 1, the fishing spike 10 comprises three elongated members of approximately the same length. These include upper body member 16, a center body member 18, and a lower body member 20. Each body member is of angular of V-shaped cross section with side flange portions which intersect in an inner edge, and is preferably made from aluminum angle stock so that it will be low in cost, light in weight and rustproof.

The lower body member 20 has a pointed lower end 22 to facilitate inserting the device into sand or amongst rocks. It also contains openings 24 and 25 in the two flange portions (FIG. 3) adjacent the upper end thereof for assembling the members in the form of a tripod (FIG. 6) as will be described more fully hereinafter, and a third opening 26 near the upper end at the edge where the two flange portions are joined together (FIG. 3) for use in connecting together the various members in overlapping end-to-end relationship as shown in FIG. 1.

The center body member 18 contains an opening 28 in the lower portion thereof at the inner edge where the two flange portions are joined together (FIG. 3). A bolt 30 which has a thumb nut 31 on the end thereof extends through the openings 26 and 28 to connect together the lower and center body members when they are in overlapping end-to-end relationship as shown in FIG. 1. The upper portion of the center body member 18 contains a similarly located opening 32 (FIG. 2) for use in fastening the center body member to the upper body member as shown in FIG. 1, and two additional openings 34 and 35 in the flange portions for use in assembling the body members in the form of a tripod, as previously mentioned.

The upper body member 16 contains an opening 36 in the lower portion thereof at the inner edge. A second bolt 38 with a thumb nut 39 on the end thereof extends through the openings 32 and 36 (FIG. 2) for holding together the upper and center body members when they are positioned as shown in FIG. 1. An opening 40 (FIG. 1) is contained in one flange portion of the upper body member 16 adjacent the lower end thereof, and another opening 42 is contained in the other flange portion adjacent thereto, both of these openings being used when the body members are connected together in the form of a tripod as shown in FIG. 6.

Referring to FIG. 1, the handle 14 of the fishing rod is positioned in a socket 44 which is mounted in the trough formed by the flange portions of the upper body members. This socket includes a cylindrical section 46 which may be a short length of aluminum tubing and which contains diametrically opposed openings 48 and 50 (FIG. 2) adjacent the lower edge thereof. A tubular member 52 is positioned transversely within the cylindrical section 46 in alignment with the openings 48 and 50, and the screw 38 (previously described) extends through said openings and the tubular member 52. A nut 54 is threaded on the screw 38 in engagement with the outer surface of the cylindrical section 46 to maintain the position of the screw 38 and tubular member 52 within the cylindrical section 46.

As will be readily apparent, the tubular member 52 supports and acts as a stop for the handle 14 (FIG. 1) and also prevents the cylindrical section 46 from becoming distorted when the thumb nut 39 or the nut 54 is tightened on the screw 38.

When the device is to be used in sand or amongst rocks, the body members are assembled in overlapping end-to-end relationship as shown in FIG. 1 with the upper body member 16 connected to the center body member 18 by means of the screw 38, and the center body member 18 connected to the lower body member 20 by means of the screw 30. Thus, with the pointed end 22 at the bottom of the device, it can be readily inserted into the sand or lodged between rocks. The fishing rod 12 can then be positioned in the trough formed by the flange portions of the upper body member 16, with the handle in the supporting socket 44. The angled cross-sectional shape of the member 20 prevents it from tilting or twisting in the sand and forms a stable cradle for the handle portion 14 of the rod 12.

On the other hand, when the device is to be used on a hard flat surface such as the top of a retaining wall or the like, the three body members are assembled in a tripod arrangement as shown in FIG. 6. In this arrangement, the upper body member 16 and the center body member 18 are fastened angularly together with a flange portion of the member 16 in face-to-face relationship with a flange portion of the member 18, by means of the screw 30 which extends through the opening 42 in the upper body member and through the opening 34 in the center body member. The lower body member 20 is then positioned as shown in FIG. 6 with its flange portions in face-to-face relationship with the flange portions of the other two members, and is fastened to the upper body member by means of a first auxiliary screw 56 which extends through the opening 40 in the upper body member 20 and through the opening 24 in the lower body member. A second auxiliary screw 57 is then inserted through the opening 35 in the center body member 18 and the opening 25 in the lower body member 20. This face-to-face interconnected relationship rigidifies the three members so that there is no possibility of a relative twisting between any of the members.

It will be readily apparent that when the three body members are assembled as shown in FIG. 6, the handle 14 of the fishing rod can be positioned in the trough formed by the flange portions of the upper body member 16, with the bottom of the handle resting on the tubular member 52, in substantially the same manner as when the body members are assembled in overlapping end-to-end relationship. Also, the three-legged construction permits the device to be mounted on a surface which is not completely flat without danger of rocking or tipping. Obviously, a tackle box or rocks can be placed on the members 18 and 20 to further prevent any tipping.

When it is desired to store the device, as for example in a tackle box, the three body members are disconnected one from the other, and placed together in a nested position as shown in FIG. 4 with the upper body member 16 on top and the lower body member 20 on the bottom. It will be noted that the screw 30 fastens together the lower body member 20 and the center body member 18, and the screw 38 fastens together the upper body member 16 and the center body member 18, whereby all three body members are securely connected together in a very compact arrangement.

Thus, it will be readily apparent that there has been provided a novel universal fishing spike which fulfills all of the objects and advantages sought therefor. The spike can be assembled with the body members in an overlapping end-to-end relationship (FIG. 1) whereby it can be used in sand or amongst rocks, or it can be assembled with the body members in a tripod configuration (FIG. 6) whereby the device can be used on a hard flat surface. Also, the body members can be easily and quickly disassembled and nested together in a compact grouping for storage purposes (FIG. 4). Furthermore, the device is rustproof and light in weight and is made from standard and readily available structural shapes so as to be relatively inexpensive to manufacture.

In some instances it is possible to make the invention in but two sections each longer than those illustrated. Alternatively, the upper body member 16 and the lower body member 20 of the illustrated embodiment may be directly assembled to form a fishing spike of sufficient length for some purposes.

It is to be understood that the foregoing description and the accompanying drawing have been given only by way of illustration and example, and that changes and alterations in the present disclosure which will be readily apparent to one skilled in the art, are contemplated as within the scope of the present invention which is limited only by the claims which follow.

I claim:

1. A universal fishing spike, comprising: a plurality of body members, each of which is of approximately the same length and of trough-like cross section with intersecting flange portions; a socket for receiving the handle of a fishing rod mounted on one body member inwardly of one end thereof and in the trough formed by the flange portions; and openings in the body members adjacent the ends thereof for receiving a bolt whereby said members can be changed between an operative position in which the body members are fastened together in aligned overlapping end-to-end relationship, and a storage position in which the body members are fastened together in a nested position with one on top of the other.

2. A universal fishing spike, comprising: an upper body member, a center body member, and a lower body member, each of said body members being elongated of approximately the same length with side flange portions intersecting in an inner edge; a socket for receiving the handle of a fishing rod mounted on the upper body member in the trough formed by the flange portions; openings at the inner edge of the center body member adjacent each end thereof; an opening at the inner edge of the upper body member adjacent one end thereof which is in alignment with one of said openings in the center body member when the ends of said members are in a first position in aligned overlapping end-to-end relationship; an opening at the inner edge of the lower body member adjacent one end thereof which is in an alignment with the other opening in the center body member when the ends of said members are positioned in said aligned overlapping end-to-end first position; and bolt-like means for insertion through said openings for alternately fastening said body members in said first position and a second position in which the members are in a nested relationship with one on top of the other.

3. A universal fishing spike, comprising: an upper body member, a center body member, and a lower body member, each of said body members being of approximately the same length with side flange portions intersecting in an inner edge; openings at the inner edge of the center body member adjacent each end thereof; an opening at the inner edge of the upper body member adjacent one end thereof which is in alignment with one of said openings in the center body member when the ends of said members are positioned in aligned overlapping end-to-end relationship; an opening at the inner edge of the lower body member adjacent one end thereof which is in alignment with the other opening in the center body member when the ends of said members are positioned in aligned overlapping end-to-end relationship; and a removable socket assembly for receiving the handle of a fishing rod mounted on the upper body member in the trough formed by the flange portions and including a removable bolt which extends through the openings in the upper and center body members when they are positioned in said overlapping relationship to fasten them together and to fasten the socket assembly to the upper body member.

4. A universal fishing spike, comprising: three body members of approximately the same length; a socket for receiving the handle of a fishing rod mounted on one of said members; and means including openings formed in the body members adjacent the ends thereof for changing their assembled position between a first position in which the members are connected together in end-to-end relationship with the member containing the socket at one end of the assembly, and a second position in which the members are connected together in a tripod relationship with the socket on the outside of the assembly.

5. A universal fishing spike, comprising: three body members of approximately the same length, each of said body members being of trough-like cross section with intersecting flange portions; a socket for receiving the handle of a fishing rod mounted on one body member in the trough formed by the flange portions; and means including openings formed in the body members adjacent the ends thereof for changing their assembled position among a first operative position in which the members are connected together in aligned overlapping end-to-end relationship with the member containing the socket at one end of the assembly, a second operative position in which the members are connected together in a tripod relationship with the socket on the outside of the assembly, and a storage position in which the members are nested together, one on top of the other with the member containing the socket on the top of the assembly.

6. A universal fishing spike, comprising: three body members of approximately the same length, each of said body members being of trough-like cross section with intersecting flange portions; a socket for receiving the handle of a fishing rod mounted on one body member in the trough formed by the flange portions; and means including openings formed in the body members adjacent the ends thereof for changing their assembled position between an operative position in which the members are connected together in aligned overlapping end-to-end relationship with the member containing the socket at one end of the assembly, and a storage position in which the members are connected together, one on top of the other in a nested relationship, with the member containing the socket on the top of the assembly.

7. A universal fishing spike, comprising: three body members of approximately the same length, each of said body members being of trough-like cross section with intersecting flange portions; a socket for receiving the handle of a fishing rod mounted on one body member in the trough formed by the flange portions; and means including openings formed in the body members adjacent the ends thereof for changing their assembled position between an operative position in which the members are connected together in a tripod relationship with the socket on the outside of the assembly, and a storage position in which the members are connected together, one on top of the other in a nested relationship, with the member containing the socket on the top of the assembly.

8. A universal fishing spike, comprising: a plurality of elongated body members of similar trough-like configuration; means for removably fastening together said body members in aligned end-to-end relationship with one of said members at the upper end; and a socket for receiving the handle of a fishing pole mounted in the upper member inwardly of the upper end thereof and including a short cylindrical member, a tubular member positioned within the cylindrical member so as to extend transversely thereof, and a bolt extending through the cylindrical member, the tubular member and the body member, said bolt being used to alternatively fasten together the members in the end-to-end relationship and in a nested relationship with one on top of the other.

References Cited in the file of this patent

UNITED STATES PATENTS

| | | |
|---|---|---|
| 1,017,833 | White | Feb. 20, 1912 |
| 1,952,789 | Butts | Mar. 27, 1934 |
| 2,451,363 | Sonner | Oct. 12, 1948 |
| 2,559,302 | Louft | July 3, 1951 |
| 2,592,895 | Harris | Apr. 15, 1952 |
| 2,665,866 | Goldinger | Jan. 12, 1954 |